United States Patent
Ward et al.

[11] 3,982,244
[45] Sept. 21, 1976

[54] RADAR ANTENNA, MONOPULSE COMPARATOR NETWORK AND MIXER SIMULATOR

[75] Inventors: Robert C. Ward, Huntsville; Franklin M. Waddle, Hartselle, both of Ala.

[73] Assignee: The United States of America as represented by the Secretary of the Army, Washington, D.C.

[22] Filed: June 30, 1975

[21] Appl. No.: 591,925

[52] U.S. Cl. ............................. 343/16 M; 35/10.4; 343/17.7
[51] Int. Cl.² .................... G01S 9/02; G01S 7/40; G01S 9/22
[58] Field of Search ................ 343/16 M, 17.7; 35/10.4

[56] References Cited
UNITED STATES PATENTS

| | | |
|---|---|---|
| 3,113,312 | 12/1963 | Begeman .............................. 35/10.4 |
| 3,243,815 | 3/1966 | Dynan et al. ...................... 343/16 M |
| 3,604,828 | 9/1971 | Perkovich ............................ 35/10.4 |
| 3,665,616 | 5/1972 | Bassard et al. ..................... 343/17.7 |

*Primary Examiner*—Maynard R. Wilbur
*Assistant Examiner*—S. C. Buczinski
*Attorney, Agent, or Firm*—Nathan Edelberg; Robert P. Gibson; Jack W. Voigt

[57] ABSTRACT

The radar antenna, monopulse comparator network, and mixer simulator is a real-time computer controlled simulation of the antenna, monopulse comparator network, and rf mixer of tracking radar systems which normally transform the angle of arrival of incoming signals into amplitude and phase modulations on intermediate frequency sum and difference channel signals. The simulator produces appropriately modulated intermediate frequency (IF) sum and difference channel signals as a function of computer derived spatial angle information. These IF signals correspond to the radar-hardware-derived sum and difference channel IF signals.

6 Claims, 5 Drawing Figures

RADAR ANTENNA, MONOPULSE COMPARATOR NETWORK AND MIXER SIMULATOR

DEDICATORY CLAUSE

The invention described herein may be manufactured, used, and licensed by or for the Government for governmental purposes without the payment to us of any royalties thereon.

BACKGROUND OF THE INVENTION

In prior art testing of monopulse radar signal processing circuitry, use of the complete radar system to obtain complete angle-error information from complex reflective sources of energy required a large area for accurate testing. A signal was required to be transmitted to a far-field target for reflection back to the radar circuitry under test. Current state of the art methods employ a real-time computer controlled radar simulator utilizing an anechoic chamber designed for a specific range of rf frequencies. Thus a new chamber is required if the rf frequency band of interest does not lie within the specifications of the chamber. Use of an anechoic chamber also inherently restricts the application of the simulator to passive and semi-active sensors. A limited number of discrete signals must be radiated in such chambers to simulate continuous functions such as the spatial and frequency characteristics of radar clutter. In many radar systems the physical features may not be amenable to rf chamber simulation in that, for example, the antenna may have to operate within its near-field and system tracking accuracy may be desired which exceeds target positioning capabilities within the chamber, resulting in inaccurate results.

Monopulse radar systems are disclosed in the "Radar Handbook" by Skolnik published by McGraw-Hill Book Company in 1970, reference section 21.4 and page 21-13 for a block diagram of a conventional monopulse radar. In current systems for testing the limits of the radar signal processing circuitry, the monopulse feedhorn and antenna assembly are placed in an anechoic chamber for receiving rf signals from an antenna representing a target that reflects energy toward the receiver. Typically the target antenna has signals representing target signal strength, clutter, and electronic countermeasures signals incorporated therein. These signals are initiated by a master control computer which activates slave computer systems to initiate the signal generating equiment to electronic countermeasures equipment, or random noise equipment as desired to cover the span and intensity of signals which should be detected by the radar signal processing circuitry. Upon command from the master control computer the slave computers may generate digital control signals which are fed to appropriate signal generation hardware or random noise hardware to simulate random phenomenon such as amplitude scintillation, which is used in the calculation of the digital control signals. Signal generation equipment interface circuitry takes the digital control signals from the computers and provides the control signals to the signal generation equipment in the proper format which allows the rf antenna to simulate a target. Typical of these prior art computer systems is the model CDC6600 computer provided by Computer Development Corporation.

SUMMARY OF THE INVENTION

The radar antenna, monopulse comparator network, and mixer simulator is a simulation apparatus and method for tracking radars wherein the radar monopulse antenna, monopulse comparator network, and rf mixer are bypassed. The simulator operates in real time utilizing computer controlled hardware to transform the angle of arrival of each simulated incoming signal into amplitude and phase modulations on the simulated IF sum and difference channel signals of the radar. The invention allows the computer-controlled simulations to be performed using most of the tracking radar's hardware, but without having to spatially separate radar signals and without having to simulate radar return signals at the radar's operative frequency. The simulator allows radar tracking accuracies over a wide range to be obtained while limiting the operating space requirements to existing facilities and eliminates the need for an anechoic chamber.

DESCRIPTION OF THE PREFERRED EMBODIMENT

Figure 1:
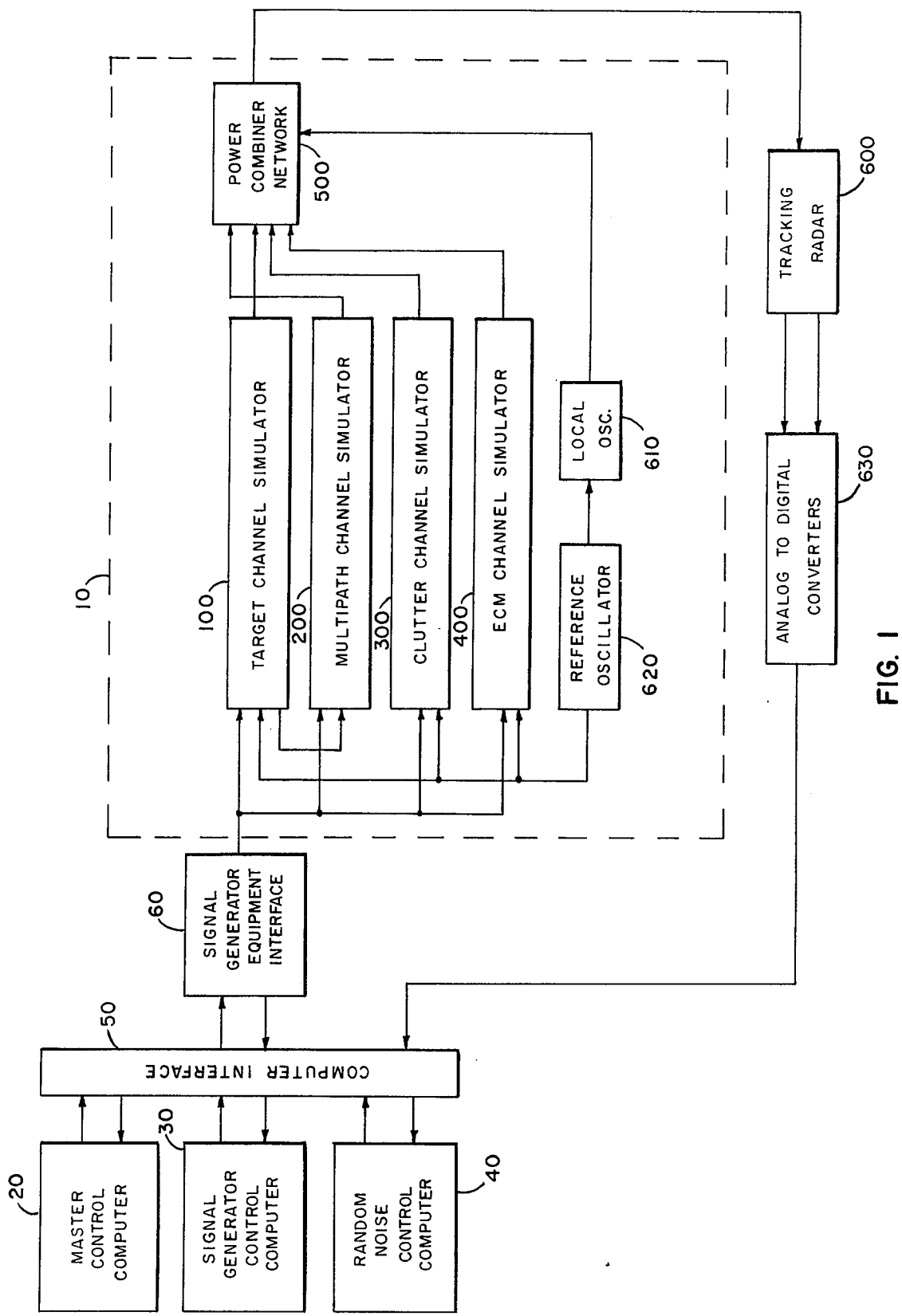
FIG. 1 is a simplified block diagram of a radar antenna, monopulse comparator network, and mixer simulator for providing simulation signals to radar signal processing circuitry.
Figure 2:
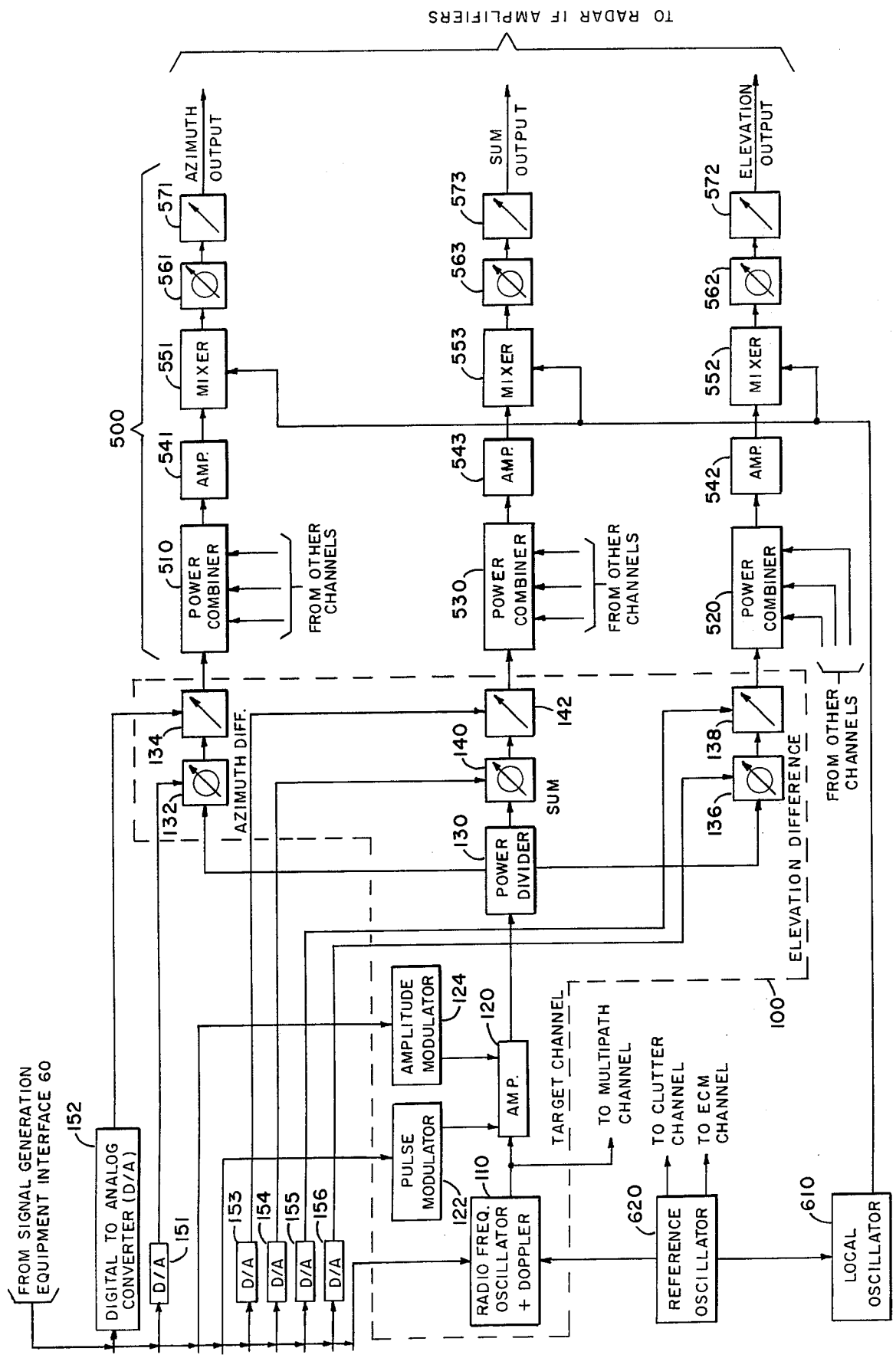
FIG. 2 is a more detailed block diagram of the simulator of FIG. 1 showing details of the target signal channel.

Referring now to the drawings wherein like numbers represent like parts the radar antenna monopulse comparator network and mixer simulator is shown in FIGS. 1 and 2 of the drawings. The simulator 10 is comprised of a plurality of simulator channels, with each channel being adapted to provide particular simulations of signals with which the radar must respond to. Simulator 10 is shown to comprise a target channel simulator 100, a multipath channel simulator 200, a clutter channel simulator 300 and an electronic countermeasures (ECM) channel simulator 400. These particular channel simulators are computer-controlled to provide preselected output signals which are known to be indicative of target return signals, clutter, ECM and other pertinent noise signals which the radar customarily receives. These output signals are coupled to a power combiner network 500 which processes the signals and provides appropriate azimuth difference, elevation difference and sum signals to the radar IF amplifiers of the tracking radar 600 for coupling to radar signal processing circuitry. A local oscillator 610 is coupled to the power combiner network for providing appropriate reference signals thereto. A reference oscillator 620 provides a phase-locked reference signal which is coupled to both the channel simulators and to the local oscillator for providing a common reference oscillator signal thereto.

Computer control of the simulator is provided by a master control computer 20, a signal generator control computer 30 and a random noise control computer 40 which are interconnected through a computer interface circuit 50 to provide input and output signals to all computers. Signal generation equipment interface circuitry 60 is coupled to receive and transmit signals to the computer interface 50 in response to computer instructions. Individual output signals are coupled from the signal generation equipment interface 60, through digital-to-analog converters where appropriate, to respective channel simulators to transform the angle of arrival of each simulated incoming signal into amplitude and phase modulations on the simulated IF sum and difference channel signals of the radar. The simulator makes it possible to perform computer-controlled simulations in real-time of tracking radars using the tracking radar's hardware, beginning at the input to the radar's first IF amplifier, but without having to simulate radar return signals at the radar's operating frequency. The tracking radar 600 has outputs coupled through analog-to-digital converters 630 to the computer interface for coupling the resultant error signals to the computer.

FIG. 2 discloses in more detail the functional block diagram of the target channel simulator 100. Channel simulators 200, 300, and 400 are identical in structure with channel 100 and for this reason are not shown in detail. Channel 200 utilizes the same rf oscillator 110 as channel 100. Target channel 100 comprises a radio frequency plus doppler oscillator 110 which is phase-locked to reference oscillator 620. Output signals from oscillator 110 are coupled to multipath channel 200 and within the target channel to an amplifier 120 which amplifies the oscillator signal and couples the signal to a power divider 130. A pulse modulator 122 and an amplitude modulator 124 have respective outputs coupled to amplifier 120 for modulating the input signals to amplifier 120. Analog input control signals to the oscillator 110, pulse modulator 122, and amplitude modulator 124 from signal generator equipment interface 60 controls the generation of oscillator frequencies and the degree of modulation applied thereto. The modulated and amplified radio frequency (rf) plus doppler is coupled through power divider 130 to respective azimuth difference, elevation difference, and sum networks. A first output of power divider 130 is coupled through a variable phase shifter 132 and a variable attenuator 134 to a power combiner circuit 510 within power combiner network 500. A second output of power divider 130 is coupled through a series connected variable phase shifter 136 and variable attenuator 138 to a second power combiner 520. The third output of power divider 130 is coupled through a variable phase shifter 140 and a variable attenuator 142 to a power combiner 530 of power combiner network 500. Phase shifter 132 provides the azimuth difference output for the target channel simulator, phase shifter 136 provides the elevation difference output from target channel 100, and variable phase shifter 140 provides the sum output from target channel 100 to the power combiner network.

The azimuth difference signal coupled to power combiner 510 is combined therein with the azimuth signals from other channels, and coupled through an amplifier 541 to a mixer 551 where local oscillator (LO) 610 is used to mix the azimuth difference signal to the radar system's intermediate frequency. A variable phase shifter 561 and a variable attenuator 571 couple the output azimuth signal to radar IF amplifiers. These signals are further processed by the radar signal processing circuitry to test the response of the signal processing circuits for known and variable input signals. Similarly the output of power combiner 520 is a combination of other channel elevation signals and is coupled through an amplifier 542, a mixer 552, a variable phase shifter 562 and a variable attenuator 572 prior to coupling the combined elevation output to further radar processing circuits. The sum input to power combiner 530 is, similarly, combined with input signals from other channels and coupled through serially connected amplifier 543, mixer 553, variable phase shifter 563 and variable attenuator 573 to provide the sum output to the radar IF amplifiers.

Control signals from the signal generation equipment interface 60 are coupled to the respective target channel simulator variable phase shifters and variable attenuators by way of digital to analog converters for providing an analog control of the phase shifters and attenuators. The control input signals from interface circuit 60 are coupled through digital to analog converter (D/A) 151 to variable phase shifter 132, D/A converter 152 to variable attenuator 134, D/A converter 153 to variable attenuator 142, D/A converter 154 to variable phase shifter 140, D/A converter 155 to variable attenuator 138, and D/A converter 156 to variable phase shifter 136.

In operation, the doppler frequency of a simulated target return signal is computed in real time by the digital computer and is used to set the frequency of oscillator 110 which is phase-locked to the reference oscillator 620. The output frequency of oscillator 110 is a convenient simulation system rf frequency plus the doppler frequency of the simulated target. The output of oscillator 110 is coupled to amplifier 120 and is pulse modulated and amplitude modulated to produce a real-time envelope modulated signal whereby a properly shaped output pulse is generated to simulate a target return signal. The time of generation of the pulse is determined by the real time calculation of the target range delay as determined by the range of a simulated target by the computer. The amplitude modulator 124 sets the amplitude of the pulse based upon a real-time calculation of received signal amplitude as determined by the simulated characteristics of the radar, target, and environment, as for example the simulated target range, the radar power, and the amplitude scintillation of the target return signal. The output of the amplifier is coupled to power divider 130 where it is divided into three channels.

The three channel output of power divider 130 simulates the sum, azimuth difference and elevation difference channels of a monopulse radar system. The relative phases and amplitudes of these three channels are adjusted in real-time by computer control of the variable phase shifters 132, 136 and 140 and of the variable attenuators 134, 138 and 142. These relative phases and amplitudes are previously determined utilizing radar antenna pattern and boresight, target angular position relative to boresight, target glint, and phase and amplitude imbalances between channels of the actual monopulse radar system. The signals in the two difference channels and the sum channel are applied to the power combiners 510, 520, and 530 respectively and are summed with similar channel outputs for multipath, clutter, rain, chaff, ECM, and other sum and difference signals. The sum and two difference channel signals are mixed down to the tactical radar intermediate frequency by appropriate channel mixers 551, 552, and 553 by mixing the signal with the output of local oscillator 610. The output frequency of local oscillator 610 is phase-locked to the output of reference oscillator 620. The variable phase shifters and variable attenuators of the power combiner network are controlled manually to simulate constant phase and amplitude imbalances for a particular system. The signals out of the variable attenuators are then coupled to the IF sum and difference channels of the tactical monopulse radar. The radar tracking loop is closed by coupling the tracking radar's azimuth and elevation error outputs through analog-to-digital converters 630 to computer interface 50 to the master control computer 20. The signals are used in the master control computer 20 to compute updated antenna boresight position. This new antenna boresight position is used to modify the amplitude and phase of the simulated signals in the next cycle of simulation operation.

With channel 100 being representative of all simulator channels, the computer causes the generation of an rf signal from oscillator 110 which is modulated, divided into sum, azimuth difference, and elevation difference channel signals. These signals are then appropriately phase and amplitude modulated under real-time computer control to provide simulated characteristics of the sum, azimuth difference, and elevation difference channels which are then coupled to the tracking radar. These outputs are summed with the corresponding outputs of the other channel simulators to provide composite signals. These composite sum, elevation difference, and azimuth difference signals are heterodyned in respective channel mixers and coupled to the IF amplifier inputs of the tracking radar. The radar responds as is well known in the art and provides output tracking error signals which are coupled back to the computer to prepare the computer for the next cycle of operation.

The control computers and interfaces have been used in prior art anechoic chamber testing. Signals from the signal generation equipment interface are in the form of digital words which are sent to the signal generation equipment of respective target channel simulators at a data rate of up to one Khz. Since the variable phase shifters and variable attenuators require and analog input, these control signals are first converted to analog in the digital-to-analog converters. Control computer 20 has complete control of the simulation test in accordance with a previously established operating sequence. Computer 30, upon command from the control computer 20, generates the digital control signals which are fed to the appropriate signal generation circuits of the channel simulator by the interface equipment 50 and 60. Computer 40 is used to generate the random noise which simulates random phenomenon, such as amplitude scinillation, which is used in the calculation of the digital control signals. The signal generation equipment interface takes digital control signals from the computers and provides the control signals to the signal generation equipment in proper format. Signal generation equipment interface is established in the art and the interface function of equipment interface 60 may be provided, for example, by rf generation control interface and channel interface equipment as has been provided in the prior art by the Boeing Aerospace Company in a radio frequency simulation system. However, equipment interface 60 need not be as complex.

A typical working model of this simulator system can be constructed with the following typical components

| | |
|---|---|
| oscillator 110 | Hewlett Packard Model 5105A/5110B |
| oscillator 610 | Hewlett Packard 5105A/5110B |
| power divider 130 | Merrimac Model PD-30-200 |
| power combiner 510 | Anzac DFH-7850 or BCH-7850 |
| mixer | Hewlett Packard Model 10514A |
| variable attenuator 134 | Hewlett Packard Model 10514A mixer used as a current controlled attenuator |
| variable phase shifter 132 | Merrimac Model PSE-3-160 |

While the invention has been described in connection with certain specific embodiments thereof, it will now be understood that other modifications will suggest themselves to those skilled in the art and it is intended to cover such modifications that fall within the scope of the claims appended hereto.

We claim:

1. A radar antenna, monopulse comparator network, and mixer simulator comprising: a plurality of channel simulators, each of said channel simulators having separate sum, azimuth difference, and elevation difference output signals; each of said channel simulators having plural inputs for providing control signals thereto; a power combiner network having inputs coupled to receive said channel simulator output signals for combining like signals from the respective channels, said combiner network having respective composite outputs of said sum azimuth difference and elevation difference signals for coupling to radar tracking intermediate frequency circuits.

2. A radar antenna, monopulse comparator network, and mixer simulator as set forth in claim 1 wherein said channel simulators each comprise a radio frequency amplifier; an oscillator coupled to said amplifier for coupling a high frequency signal thereto; a pulse modulator and an amplitude modulator having outputs coupled to said amplifier for modulating rf signals therein; a power divider having an input coupled to the output of said amplifier, said power divider having respective sum, azimuth difference, and elevation difference outputs thereof coupled to said combiner network.

3. A radar antenna, monopulse comparator network and mixer simulator as set forth in claim 2 wherein said channel simulators each further comprise a variable phase shifter and a variable attenuator connected in series between said power divider outputs and said power combiner network inputs.

4. A radar antenna, monopulse comparator network and mixer simulator as set forth in claim 3 and comprising a computer having control outputs coupled as inputs to said variable attenuator, variable phase shifter, amplitude modulator, pulse modulator, and radio frequency oscillator of said channel simultors for coupling control signals thereto; said attenuator, phase shifter, amplitude modulator, pulse modulator and oscillator being responsive to said control signals to provide a varying output signal.

5. A radar antenna, monopulse comparator network, and mixer simulator as set forth in claim 4 wherein said combiner network comprises first, second and third power combiners connected respectively to receive said azimuth difference output, said sum output, and said elevation difference output of said power divider of each channel simulator, each of said power combiners having an output coupled to provide output signals to said radar tracking intermediate frequency circuits.

6. A radar antenna, monopulse comparator network, and mixer simulator as set forth in claim 5 and further comprising a series connected mixer, variable phase shifter, and variable attenuator respectively coupled between each of said power combiners and said outputs to radar tracking intermediate frequency circuits, the output of said power combiner being coupled to the first input of said mixer; and further comprising a local oscillator having an input and an output, and a reference oscillator, said reference oscillators being coupled to provide an output signal to said radio frequency oscillator and an output signal to said local oscillator for phase-locking said oscillators, said local oscillator output being coupled to each of said mixers for providing a common reference frequency between the input of said channel simulators and the mixers associated with each power combiner for controlling the output frequency from said power combiner network.

* * * * *